(12) United States Patent
Nelson et al.

(10) Patent No.: US 12,734,660 B1
(45) Date of Patent: Sep. 15, 2026

(54) SYSTEMS, METHODS, AND DEVICES FOR FACILITATING REMOVAL OF HYDRAULIC CYLINDERS FROM BRAKE SYSTEMS

(71) Applicant: Inventus Holdings, LLC, Juno Beach, FL (US)

(72) Inventors: Avery E. Nelson, Onawa, IA (US); Harry J. Polenychko, Spirit Lake, IA (US); Tristan L. Mammen, Correctionville, IA (US); Xavier Lebrija, Palm Beach Gardens, FL (US)

(73) Assignee: Inventus Holdings, LLC, Juno Beach, FL (US)

( * ) Notice: Subject to any disclaimer, the term of this patent is extended or adjusted under 35 U.S.C. 154(b) by 7 days.

(21) Appl. No.: 19/205,705

(22) Filed: May 12, 2025

(51) Int. Cl.
*B25B 27/14* (2006.01)
*F03D 80/50* (2016.01)

(52) U.S. Cl.
CPC .............. *B25B 27/14* (2013.01); *F03D 80/50* (2016.05); *F05B 2230/70* (2013.01)

(58) Field of Classification Search
CPC ..... F03D 7/0244; F03D 7/0248; F03D 7/0252
See application file for complete search history.

(56) References Cited

U.S. PATENT DOCUMENTS 4,455,730 A 6/1984 Guenther
9,016,173 B1 * 4/2015 Saftoiu ............... B25B 23/0035 81/57.44
9,874,257 B2 * 1/2018 Son ......................... F16D 65/18
10,989,168 B2 * 4/2021 Woods .................. F03D 7/0244
12,497,946 B2 * 12/2025 Damgaard ............ F03D 7/0204
2019/0195196 A1 * 6/2019 Winslow ................... B24B 7/16
2023/0175482 A1 * 6/2023 Baldwin ................. F16D 65/18 290/44

(Continued)

FOREIGN PATENT DOCUMENTS

CN 202579522 U * 12/2012
CN 203003759 U * 6/2013
CN 204226334 U * 3/2015

(Continued)

OTHER PUBLICATIONS

Translation of CN-107255101-A (Year: 2017).*

(Continued)

*Primary Examiner* — Jacob J Cigna
(74) *Attorney, Agent, or Firm* — TROUTMAN PEPPER LOCKE LLP; Dustin B. Weeks

(57) ABSTRACT

The disclosed technology relates generally to systems, methods, and devices for facilitating removal of hydraulic cylinders from brake systems. The disclosed technology includes a method for facilitating removal of a hydraulic cylinder from a brake system. The method includes inserting a tool, at least partially, into a plunger aperture of the hydraulic cylinder. The hydraulic cylinder, in some examples, can be a hydraulic cylinder of a yaw brake system for a wind turbine. The tool includes an outer perimeter configured to engage an inner surface of the plunger aperture. In some examples, the tool includes a first portion and a second portion. The first portion is configured to be coupled to a torque device, and the second portion includes the outer perimeter. The method includes applying a torque to the tool to rotate the hydraulic cylinder.

14 Claims, 14 Drawing Sheets

(56) References Cited

U.S. PATENT DOCUMENTS

2024/0288041 A1* 8/2024 Winslow ............... F03D 7/0204

FOREIGN PATENT DOCUMENTS

| | | | | | |
|---|---|---|---|---|---|
| CN | 106524884 | A | * | 3/2017 | ............. G01B 7/003 |
| CN | 107255101 | A | * | 10/2017 | .......... F15B 15/1457 |
| CN | 207942350 | U | * | 10/2018 | |
| CN | 216430132 | U | * | 5/2022 | |
| CN | 216842567 | U | * | 6/2022 | |
| CN | 220593010 | U | * | 3/2024 | |
| CN | 221416455 | U | * | 7/2024 | |

OTHER PUBLICATIONS

WECS Yaw Piston Puller Kit; https://wecsrenewables.com/blog/search?s=piston; Sep. 2019.

Hydraulic Fail-Safe Disc Brake, Installation and Maintenance Manual; Svendborg Brakes; Jan. 1, 2006 https://kor-pak.com/wp-content/uploads/2015/03/Installation-and-Maintenance.pdf.

* cited by examiner

SYSTEMS, METHODS, AND DEVICES FOR FACILITATING REMOVAL OF HYDRAULIC CYLINDERS FROM BRAKE SYSTEMS

FIELD OF TECHNOLOGY

The disclosed technology relates generally to hydraulic cylinders for brake systems, and, more particularly, to systems, methods, and devices for removing hydraulic cylinders from yaw brake systems of wind turbines.

BACKGROUND

Wind turbines can include a yaw system, which optimizes performance of the wind turbine by positioning the nacelle in parallel with a direction of the wind. As shown in FIG. 1A, a wind turbine 100 can include a yaw system 110 configured to rotate a nacelle of the wind turbine 100 about a yaw axis. Traditional yaw systems, such as the yaw system 110 illustrated in FIG. 1B, typically include motors to initiate rotation of the nacelle, and brake systems referred to herein as yaw brake systems, to suspend movement of the nacelle once a desired angular position and/or displacement is reached. For example, the yaw system 110 can include a yaw brake system 112, as shown in FIG. 1B. Additionally, yaw brake systems can act as dampers for the yaw system, enabling a smooth transition between accelerating and braking during rotation. As shown in FIG. 1B, the yaw brake system 112 can employ a plurality of brakes disposed about a circumference of the yaw brake system 112. Traditionally, some yaw brake systems have been comprised of passive brakes, which do not require external input to perform the braking function. An example passive brake includes one or more compressed washer stacks configured to provide a force to a brake pad, the brake pad providing a damping force from a friction reaction with the yaw system.

Recently, more yaw brake systems have begun to include active brakes, which provide similar functionality to passive brakes but operate with an external input. Active brakes can be hydraulically actuated, electrically actuated, etc., allowing the yaw system to actively regulate when and where braking pressure is needed. An example active brake, a hydraulic brake system 120, is illustrated in FIG. 1C. As shown, the hydraulic brake system 120 can include a hydraulic cylinder 122 and a plunger 124 configured to provide the brake pressure to the brake pad 126. Hydraulic brake systems, such as the example shown in FIG. 1C, can be configured to regulate a yawing pressure, which can reduce the force required to yaw the wind turbine, potentially extending the life of the drive/motor system of the yaw system.

However, hydraulic brake systems, such as the one shown in FIG. 1C, can be difficult to maintain and remove. As shown in FIG. 1D, an example hydraulic brake system can include a hydraulic cylinder 130 including a top portion 132 and a bottom portion 134, the top portion 132 being separable from the bottom portion 134. Hydraulic brake systems like the example hydraulic brake system can be assembled by hand, and thus can be expected to be disassembled by hand as well. However, often the bottom portion 134 will become locked up (or stuck), such that it is too difficult for one of ordinary skill in the art to remove the bottom portion 134 from the yaw brake system by hand. Current systems directed towards ameliorating this issue have proved time-consuming and thus costly for wind turbine management. Additionally, wind turbine maintenance is a dangerous process for maintenance personnel, resulting in a need to minimize the time it takes to perform such maintenance.

What is needed, therefore, is a novel system, method, and device for facilitating removal of hydraulic cylinders from brake systems. These and other advantages of the presently-disclosed technology will become apparent throughout the following disclosure.

BRIEF SUMMARY

To achieve the above-described method for facilitating removal of hydraulic cylinders from brake systems, the disclosed technology includes a method for facilitating removal of hydraulic cylinders from brake systems. The method can include inserting a tool, at least partially, into a plunger aperture of the hydraulic cylinder. The tool can include an outer perimeter configured to engage an inner surface of the plunger aperture. The method can include applying a torque to the tool to rotate the hydraulic cylinder.

According to another aspect of the present disclosure, the disclosed technology includes a system for facilitating removal of hydraulic cylinders from brake systems. The system can include a tool including an outer perimeter. The tool can be configured to be inserted, at least partially, into a plunger aperture of the hydraulic cylinder. The tool can be further configured to engage an inner surface of the plunger aperture of the hydraulic cylinder. The system can include a torque device coupled to the tool. The torque device can be configured to apply a torque to the tool. The tool can be further configured to transfer the torque to the hydraulic cylinder to rotate the hydraulic cylinder for removal from the brake system.

The disclosed technology can additionally include a tool for facilitating removal of hydraulic cylinders from brake systems. The tool can include a first portion configured to couple to a torque device. The tool can include a second portion configured to align with a plunger aperture of the hydraulic cylinder. The second portion can be further configured to be inserted, at least partially, into the plunger aperture. The second portion can include an outer perimeter configured to engage an inner surface of the plunger aperture.

BRIEF DESCRIPTION OF THE DRAWINGS

The accompanying drawings, which are incorporated in and constitute a part of this specification, illustrate various aspects of the presently disclosed subject matter and serve to explain the principles of the presently disclosed subject matter. The drawings are not intended to limit the scope of the presently disclosed subject matter in any manner.

DETAILED DESCRIPTION

Figure 1A:
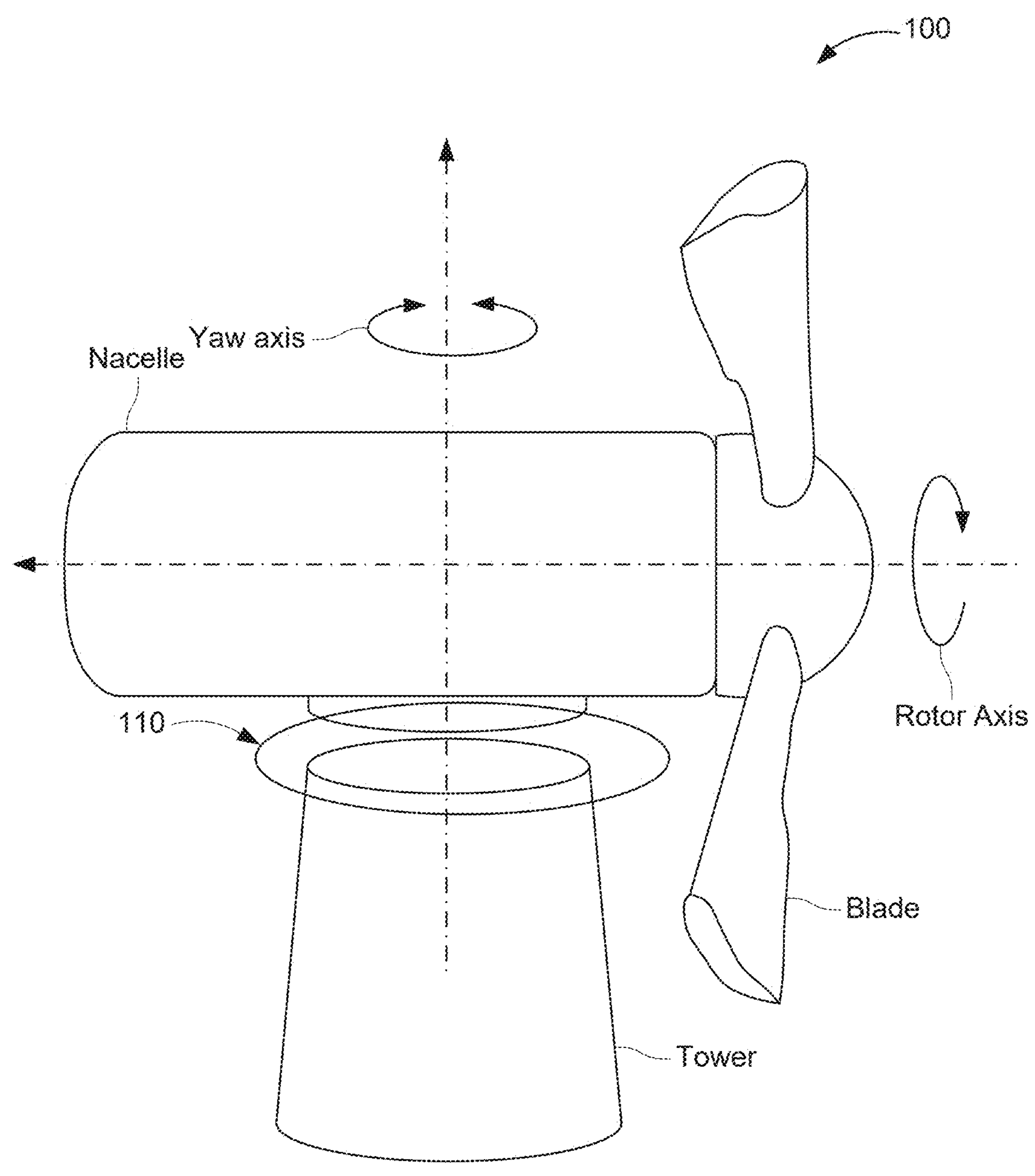
FIG. 1A illustrates an example wind turbine including a yaw system.

The disclosed technology relates generally to systems, methods, and devices for facilitating removal of hydraulic cylinders from brake systems. Unlike existing methods which are strenuous, time-consuming, and dangerous for maintenance personnel, the disclosed technology employs a novel system, method, and device for dislodging or re-aligning stuck hydraulic cylinders that can be quick, efficient, and thus safer to maintenance personnel.

The disclosed technology can include a method for facilitating removal of a hydraulic cylinder from a brake system. As can be appreciated, the method can employ systems and/or devices of the disclosed technology to aid in removal of one or more components of a hydraulic cylinder from a brake system. The method can include inserting a tool, at least partially, into a plunger aperture of the hydraulic cylinder. As will be discussed in greater detail herein, the plunger aperture can be located in a bottom portion of the hydraulic cylinder, such that the method can facilitate removal of the hydraulic cylinder from the brake system by facilitating removal of the bottom portion, or a component of the bottom portion. The tool can be a novel device of the disclosed technology, including an outer perimeter configured to engage an inner surface of the plunger aperture. That is, the method can include engaging the outer perimeter of the tool with the inner surface of the plunger aperture by inserting the tool, at least partially, into the plunger aperture. The method can further include applying a torque to the tool to rotate the hydraulic cylinder. As will be appreciated, herein, the torque can be applied to the tool by a torque device, such that the tool can be coupled to the torque device. A novel system of the disclosed technology can include the tool and torque device such that applying the torque to the tool can include transferring the torque from the torque device to the hydraulic cylinder via the tool to rotate the hydraulic cylinder. As will be appreciated, rotating the hydraulic cylinder can include rotating the bottom portion or a component of the bottom portion, such that a part of the removal process of the hydraulic cylinder can include rotating the hydraulic cylinder, the bottom portion, the component of the bottom portion, or any combination thereof. In this way, the just described method employing novel systems and devices of the disclosed technology can facilitate removal of the hydraulic cylinder by contributing to a step of the hydraulic cylinder removal process, such as rotating a component of the hydraulic cylinder including the plunger aperture.

Although various aspects of the disclosed technology are explained in detail herein, it is to be understood that other aspects of the disclosed technology are contemplated. Accordingly, it is not intended that the disclosed technology is limited in its scope to the details of construction and arrangement of components expressly set forth in the following description or illustrated in the drawings. The disclosed technology can be implemented and practiced or carried out in various ways. In particular, the presently disclosed subject matter is described in the context of systems, methods, and devices for facilitating removal of hydraulic cylinders from brake systems. The present disclosure, however, is not so limited, and can be applicable in other contexts such as systems, methods, and devices used for facilitating removal of hydraulic cylinders from brake systems for other purposes such as academic and industrial purposes. Accordingly, when the present disclosure is described in the context of systems, methods, and devices of facilitating removal of hydraulic cylinders from brake systems, it will be understood that other implementations can take the place of those referred to herein.

It should also be noted that, as used in the specification and the appended claims, the singular forms "a," "an," and "the" include plural references unless the context clearly dictates otherwise. References to a composition containing "a" constituent is intended to include other constituents in addition to the one named.

Also, in describing the disclosed technology, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, the disclosed technology can include from the one particular value and/or to the other particular value. Further, ranges described as being between a first value and a second value are inclusive of the first and second values. Likewise, ranges described as being from a first value and to a second value are inclusive of the first and second values.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, similar components that are developed after development of the presently disclosed subject matter.

As used herein, the term "tool" can include any device configured to transfer a rotational force, referred to herein as a torque, from one element to another element. Devices, systems, and methods of the disclosed technology may include a tool configured to transfer an externally supplied torque to a hydraulic cylinder, so as to unjam, dislodge, realign, etc. the hydraulic cylinder and rotate the hydraulic cylinder, or at least a portion thereof, for removal.

As used herein, the term "torque device" or "torque tool" can include any device configured to generate and transfer a torque. Torque devices, as understood herein, can be manually operated, hydraulically operated, battery operated, etc., or some combination. As non-limiting examples, a torque device can be a drill, a wrench, a ratchet, or a gun.

Figure 2A:
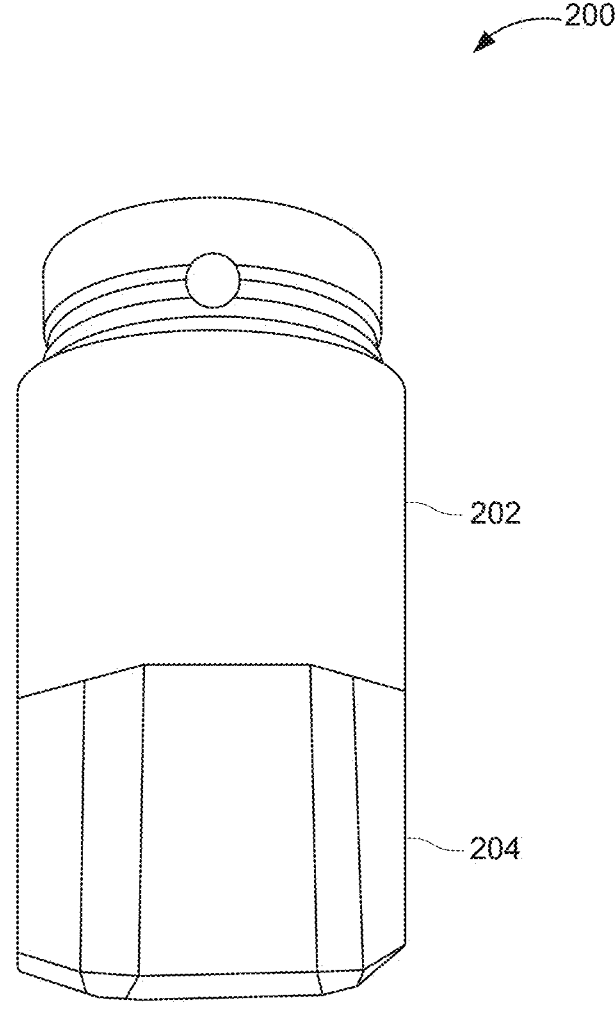
FIG. 2A illustrates a tool for facilitating removal of hydraulic cylinders from brake systems, in accordance with examples of the present disclosure.

Referring now to the drawings, in which like numerals represent like elements, the present disclosure is herein described. FIG. 2A illustrates a tool 200 that can be configured to facilitate removal of hydraulic cylinders from brake systems. As will become apparent throughout this disclosure, the tool 200 (as well as other examples described herein) can be used for transferring a torque to an aperture of the hydraulic cylinder.

The tool 200 can be a substantially cylindrical shape. In some embodiments, a portion of the tool 200 can be cylindrical and another portion of the tool 200 can be substantially prismatic. As shown, the tool 200 can include one or more prismatic portions in series, such that the tool 200 can be configured to be rotated about a centerline of the one or more prismatic portions. As will be appreciated, the tool 200 can be configured to axially revolve based at least in part on a torque applied to a portion of the tool 200.

The tool 200 can include a first portion 202 configured to couple to a torque device. The first portion 202 can include one or more ridges and/or one or more apertures, such that the first portion 202 of the tool 200 can be secured to a drive component, or bit, of the torque device. For example, the first portion 202 can include one or more ridges and an aperture therethrough, as shown, based at least in part on a coupling mechanism of the drive component.

The tool 200 can include a second portion 204. As will be discussed in greater detail herein, the second portion 204 can include an outer perimeter configured to engage an inner surface of a plunger aperture of a hydraulic cylinder. Stated otherwise, the second portion 204 can be configured to align with a plunger aperture of a hydraulic cylinder, such that when inserted at least partially into the plunger aperture, the outer perimeter of the second portion 204 can engage an inner surface of the plunger aperture. As can be appreciated, a shape of the second portion 204 can resemble a shape of at least a portion of the plunger aperture, in that the shape can be configured to contact enough surfaces of the inner surface of the plunger aperture to enable the tool 200 to transfer torque from the torque device to the hydraulic cylinder. That is, the second portion 204 of the tool 200 can be a substantially similar shape to that of the plunger aperture of the hydraulic cylinder.

In some embodiments, the first portion 202 and the second portion 204 can be manufactured separately and joined. That is, the first portion 202 and the second portion 204 can be welded together, coupled, attached, or similar mechanisms of joining as understood by those skilled in the art. For example, the first portion 202 can include a drive component of a torque device, such that the first portion 202 can include a standard part for a torque device configured to be coupled and decoupled from the torque device. In this way, the first portion 202 can be configured to receive the torque from the torque device. In some embodiments, the second portion 204 can include a plunger, or a portion thereof, for a plunger aperture of a hydraulic cylinder. As understood by those skilled in the art, plunger apertures for hydraulic cylinders are configured to receive plungers which align with the inner surface of the plunger aperture. In this way, the second portion 204 can be a plunger machined and attached to the first portion 202, thus allowing the second portion 204 of the tool to be inserted into a plunger aperture of a hydraulic cylinder and align with the plunger aperture. As can be appreciated, plungers for hydraulic cylinders typically have a small tolerance of fit, in that the plunger will contact, or engage, much of the inner surface of the plunger aperture of the hydraulic cylinder for which the plunger is configured to be used. As will be discussed in greater detail herein, the second portion 204 of the tool 200 can be characterized by a similar tolerance of fit, enabling the tool 200 to rotate the hydraulic cylinder by transferring a torque via an engagement of the second portion 204 with an inner surface of the plunger aperture.

Alternatively, the tool 200 can be a singular manufactured piece, such that the first portion 202 and the second portion 204 can be machined from a common element. For example, the tool 200 can be fabricated using methods of molding, rolling, casting, extrusion, spinning, drawing, or similar methods of fabrication as understood by those skilled in the art. For example, the tool 200 can be fabricated via additive manufacturing. In some embodiments, a base component of the tool 200 can be fabricated via the discussed methods and then subsequently machined, via methods of machining as understood in the art, to form the first portion 202 and the second portion 204. In this way, the tool 200, in some embodiments, can be fabricated and/or machined as a single component rather than comprising separate elements joined together.

The tool 200 can include materials to enable the transfer of significant torque from the torque device to the hydraulic cylinder. As discussed herein, hydraulic cylinders can become lodged, or jammed, due to forces and stresses experience during use. As can be appreciated, the tool 200 may need to sustain substantial torque and/or shear forces in order to realign the hydraulic cylinder and rotate the hydraulic cylinders for removal. In some cases, the tool 200 can include a metal material, such as steel, aluminum, titanium, and alloys thereof. As a non-limiting example, the tool 200 can include a low-alloy steel, such as chromoly alloy. In another non-limiting example, the tool 200 can include a lower grade steel option for cost considerations.

Figure 2B:
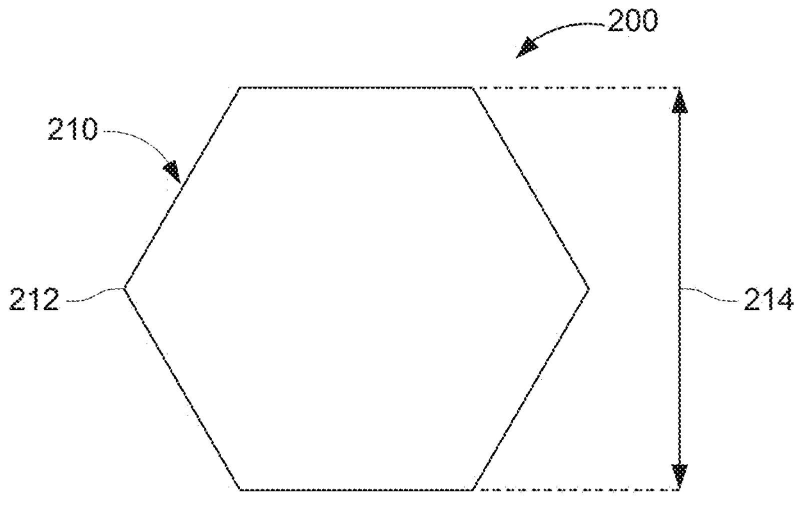
FIGS. 2B-2C illustrate a bottom view of a second portion of a tool for facilitating removal of hydraulic cylinders from brake systems, in accordance with examples of the present disclosure.
Figure 2C:
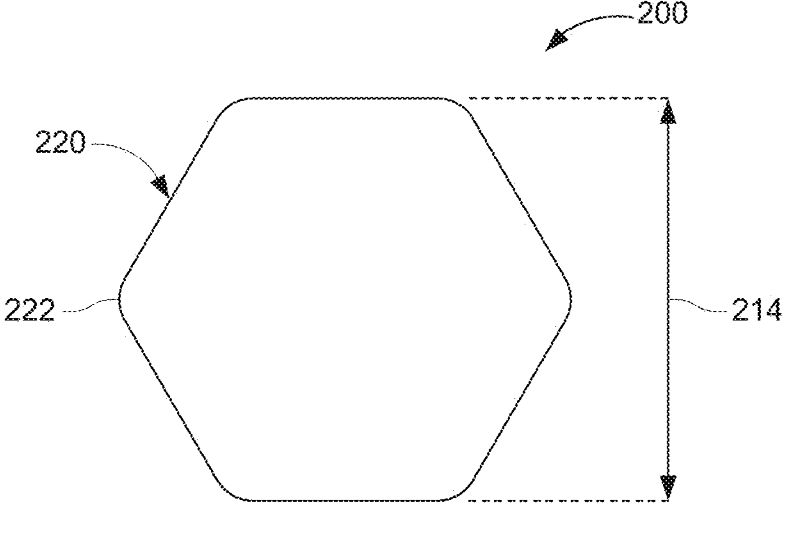

FIGS. 2B and 2C illustrate embodiments of a bottom view of the second portion for the tool 200. As discussed herein, the second portion 204 can include an outer perimeter configured to align with a plunger aperture of a hydraulic cylinder. The outer perimeter, as can be appreciated, may be a substantially similar shape as an inner surface of the plunger aperture, so as to enable the transfer of torque from the tool 200 to the hydraulic cylinder. As shown in FIGS. 2B and 2C, the outer perimeter (and similarly the plunger aperture) can be substantially hexagonal. Examples of an outer perimeter of a second portion of the tool 200 shown in FIGS. 2B-2C should not be narrowly construed to include only substantially hexagonal shapes. As can be appreciated, the outer perimeter of a second portion (e.g., the second portion 204) of the tool 200 may substantially resemble any shape of a plunger aperture of hydraulic brakes of similar contexts. In this way, outer perimeters of second portions for the tool 200 shown in FIGS. 2B-2C may be selected based at least in part on the plunger aperture of a hydraulic brake of a yaw brake system for a wind turbine, in that the plunger aperture for some embodiments of hydraulic brakes of yaw brake systems for wind turbines may include an inner surface that is substantially hexagonal.

FIG. 2B illustrates a second portion 210 for the tool 200 having an outer perimeter 212. That is, the second portion 204 can include any embodiments of the second portion 210. As shown, the outer perimeter 212 can be, at least substantially, hexagonal, in that the outer perimeter 212 can include six major sides. As discussed herein, the six major sides of the outer perimeter 212 can be configured to each align with sides of an inner surface of a plunger aperture, such that when at least partially inserted into the plunger aperture, each of the six major sides may engage the inner surface of the plunger aperture. In some embodiments, when inserted, at least partially, into a plunger aperture, each of the six major sides of the outer perimeter 212 may be configured to simultaneously engage the inner surface of the plunger aperture, so as to create a mechanical advantage for the tool 200 to rotate the hydraulic cylinder. The outer perimeter 212 may be characterized by an outer diameter 214, in that the outer diameter 214 may substantially extend an inner diameter of the inner surface of the plunger aperture. Stated otherwise, the outer perimeter 212 may have the outer diameter 214 and may substantially extend the inner diameter of the inner surface of the plunger aperture when inserted. As can be appreciated, the outer perimeter 212 can have the outer diameter 214 so as to characterize the tool 200 as having the outer diameter 214.

FIG. 2C illustrates a second portion 220 for the tool 200 having an outer perimeter 222. That is, the second portion 204 can include any embodiments of the second portion 220. As shown, the outer perimeter 222 can be characterized as being substantially hexagonal with rounded edges. That is, the second portion 220 of the tool 200 can have rounded edges. The rounded edges, as understood by those skilled in the art, can allow for further tolerance of the fit for the second portion 220 within a plunger aperture of a hydraulic cylinder. Further, the rounded edges may provide a mechanical advantage based at least in part on potential stress concentrations at corners of the outer perimeter 222. The outer perimeter 222 can include six major sides, similar to that of the second portion 210, the six major sides being connected by the rounded edges. In this way, the six major sides of the outer perimeter 222 can be configured to engage the inner surface of the plunge aperture when inserted, at least partially, into the plunger aperture. The outer perimeter 222 can be characterized by the outer diameter 214, such that the outer diameter 214 may substantially extend the inner diameter of the inner surface of the plunger aperture.

Although not shown, the outer perimeter of the second portion can include chamfered edges, such that the six major sides are joined by the chamfered edges to form a substantially hexagonal shape. Similar to the rounded edges of the outer perimeter 222, the chamfered edges can allow for further tolerance of the fit for the second portion within the plunger aperture of the hydraulic cylinder and/or may provide a mechanical advantage based at least in part on potential stress concentrations at corners of the outer perimeter.

Figure 3A:
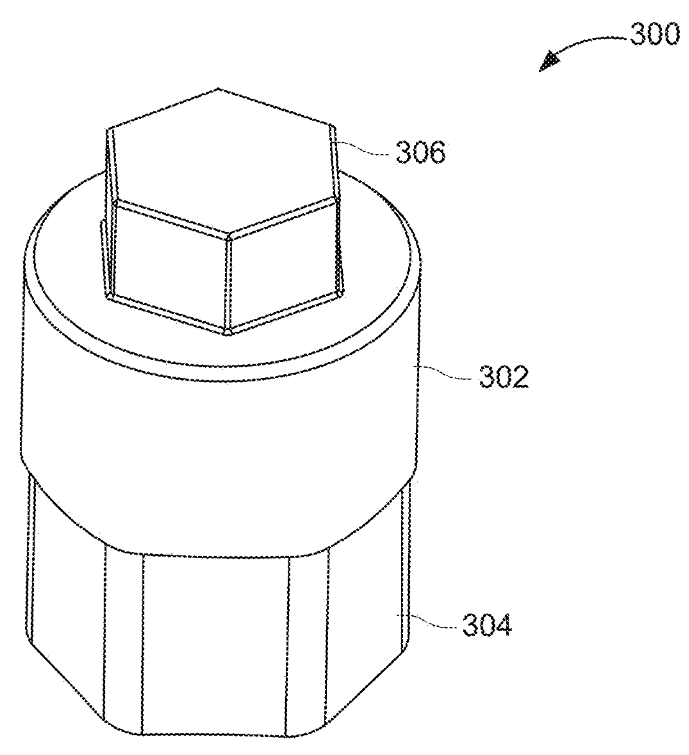
FIGS. 3A-3B illustrate a tool for facilitating removal of hydraulic cylinders from brake systems, in accordance with examples of the present disclosure.
Figure 3B:
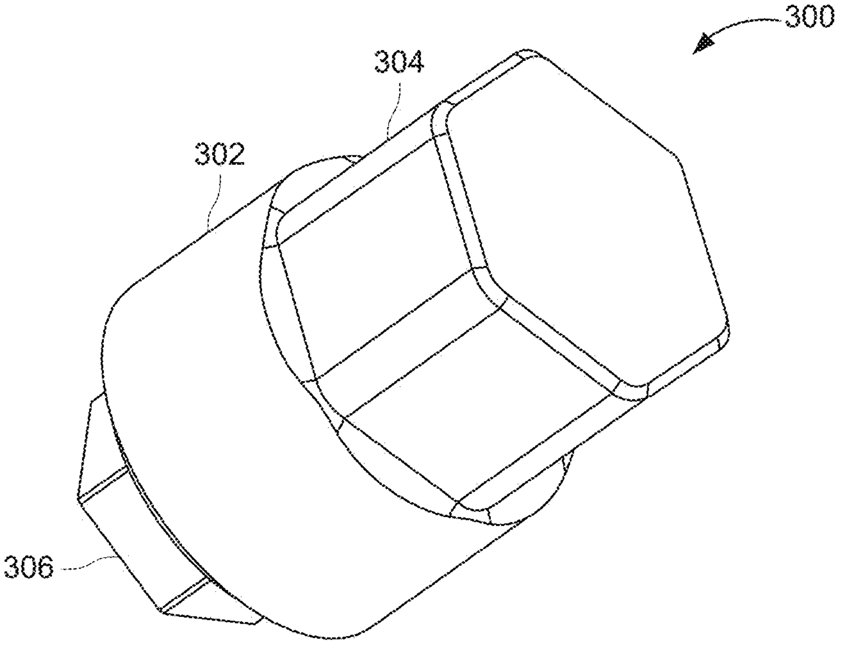

FIGS. 3A and 3B illustrate a tool 300 for facilitating removal of hydraulic cylinders from brake systems. As shown, the tool 300 can include a first portion 302 which may include any embodiments of the first portion 202 discussed herein. Additionally, the first portion 302 can include a coupling portion 306, as shown, the coupling portion 306 being configured to couple with a socket of a torque device. As understood by those skilled in the art, some embodiments of torque devices may include a socket configured to couple with an object to transfer a torque supplied from the torque device to the object. In this way, the coupling portion 306 can be configured to be inserted, at least partially, into a socket of a torque device to allow torque generated by the torque device to be transferred to the tool 300. Stated otherwise, the first portion 302 can be configured to couple the tool 300 to a torque device via the coupling portion 306. The coupling portion 306 can include a plug, which as understood by those skilled in the art, can be a male component of a male-female coupling connecting with a socket.

The tool 300 can include a second portion 304 configured to align with a plunger aperture of a hydraulic cylinder. The second portion 304 can include any embodiments, of the second portion 204, the second portion 210, and the second portion 220 discussed herein. That is, the second portion 304 can be configured to be inserted into the plunger aperture such that an outer perimeter of the second portion can engage an inner surface of the plunger aperture, allowing the tool 300 to transfer a torque to the hydraulic cylinder.

Figure 4:
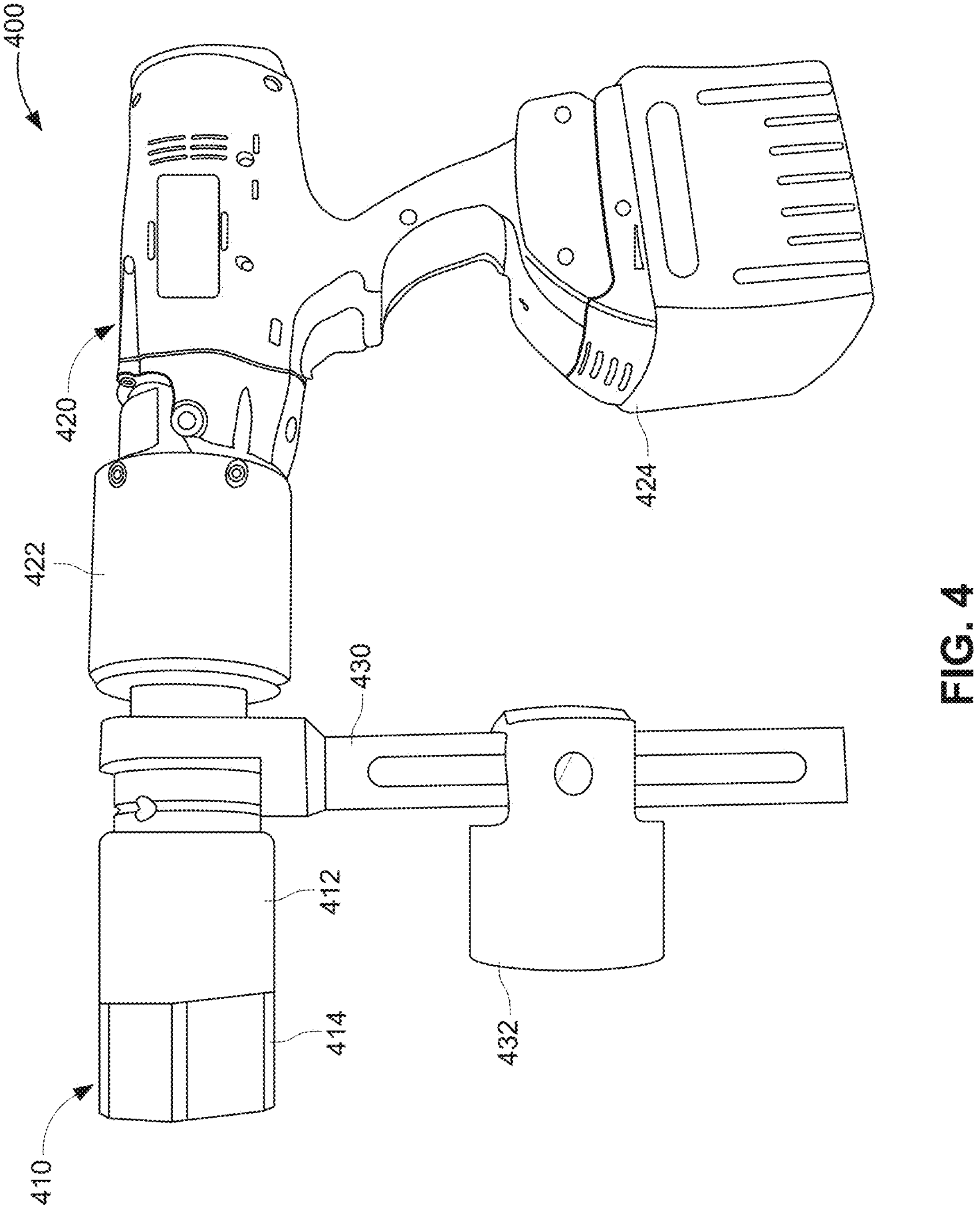
FIG. 4 illustrates a system for facilitating removal of hydraulic cylinders from brake systems, in accordance with examples of the present disclosure.

FIG. 4 illustrates a system 400 for facilitating removal of hydraulic cylinders from brake systems. The system 400 can include a tool 410 configured to be inserted, at least partially, into a plunger aperture of a hydraulic cylinder. As can be appreciated, the tool 410 can include any embodiments of the tool 200 and the tool 300 discussed herein. That is, the tool 410 can include a first portion 412 and a second portion 414. The first portion 412 can include any embodiments of the first portion 202 and the first portion 302 discussed herein. For example, the first portion 412, as shown, can include one or more ridges and an aperture configured to enable the first portion to be coupled to a torque device. Additionally, the second portion 414 can include any embodiments of the second portion 204, the second portion 210, the second portion 220, and the second portion 304 discussed herein. That is, the second portion 414 can be substantially hexagonally shaped, and may have rounded edges or chamfered edges between major sides of the substantially hexagonal of the second portion 414. In this way, the second portion 414 can be configured align with a shape and size of a plunger aperture of a hydraulic cylinder.

The system 400 can include a torque device 420 configured to apply a torque to the tool 410. The torque device 420 can include any examples of torque devices discussed herein. For example, as shown, the torque device 420 can be manually operated by an operator, in that the torque device 420 can include a trigger configured to receive an input from the operator to actuate the torque device 420.

As can be appreciated, actuating the torque device 420 can include generating a rotational force. That is, the torque device 420 can include a drive component 422 configured to transfer a torque generated by the torque device 420. Stated otherwise, the drive component 422 can include a coupling mechanism configured to rotate such that when an object is connected to the coupling mechanism, the drive component 422 can be configured to rotate the object based on a torque generated by the torque device 420.

As shown, the tool 410 can be coupled to the drive component 422. Stated otherwise, the tool 410 can be configured to be coupled to the torque device 420 via the drive component 422. In this way, the torque device 420 can be configured to apply a torque to the tool 410 by transferring the torque via the drive component 422. As can be appreciated, the tool 410 can be coupled to the drive component 422 via keying, magnetic coupling, fastening, any combination thereof, and similar forms of coupling for similar contexts as understood by those skilled in the art. In some embodiments, the tool 410 can be configured to be coupled to the coupling mechanism of the drive component 422, so as to enable the drive component 422 to rotate the tool 410. Similarly, the first portion 412 can be configured to be coupled to the coupling mechanism of the drive component 422, in that the tool 410 can be configured to couple to the torque device 420 by coupling the first portion 412 of the tool 410 to the drive component 422. As can be appreciated, the tool 410 can be configured to couple to the drive component 422 in such a way that the drive component 422 can be configured to axially rotate the tool 410, the axis of rotation being generally defined along a length of the tool 410 extending from the first portion 412 to the second portion 414.

The torque device 420 can include a power source 424 configured to provide power to the torque device 420. The power source 424, as shown, can include a power unit configured to be coupled or decoupled from the torque device 420. The power unit can include a battery, battery pack, or any examples of attachable sources of power as understood by those skilled in the art. In some embodiments, the power source 424 can be an electrical connection to an external power source, such as an electrical cord and an outlet, generator, or the like. In other embodiments, the power source 424 can be manual power, such that the torque device 420 can be configured to be operated based at least in part on a manual input from a user, such as a hand-crank, etc.

The system 400 can further include an arm 430 configured to be coupled to the torque device 420. As shown, the arm 430 can include an elongated member configured to couple to the drive component 422 at a first end and radially extend from the first end to a second end. In some embodiments, the arm 430 can be configured to be azimuthally rotated and/or positioned via external input, in that an angular position of the arm 430 about the first end can be adjusted and fixed. As can be appreciated, the arm 430 can be configured to be coupled to the drive component 422 without being driven by the drive component 422, such that when the drive component rotates the tool 410, the arm 430 can be configured to remain fixed. In this way, the external input to adjust an angular position of the arm 430 can be provided by an operator or user.

Figure 1B:
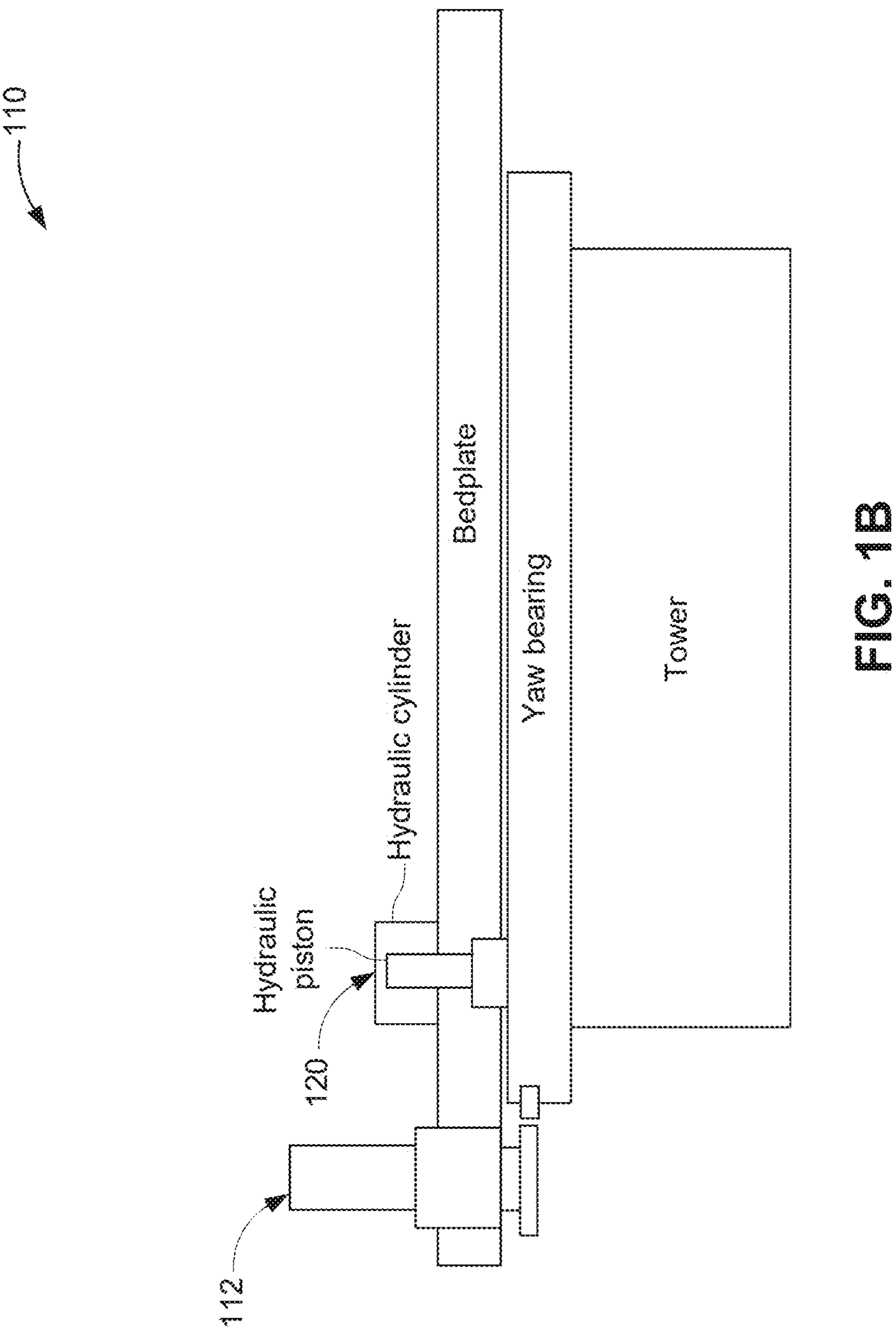
FIG. 1B illustrates an example yaw system including a yaw brake system.
Figure 1C:
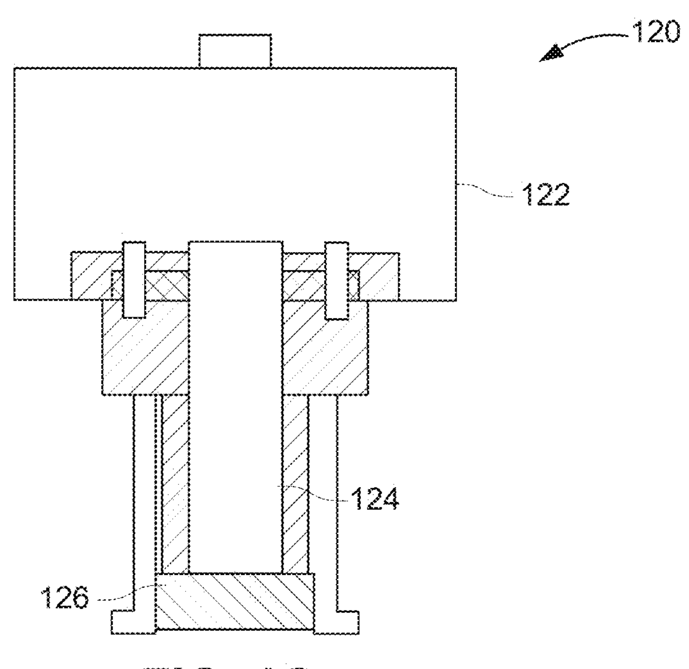
FIG. 1C illustrates an example active hydraulic brake for a yaw brake system.
Figure 1D:
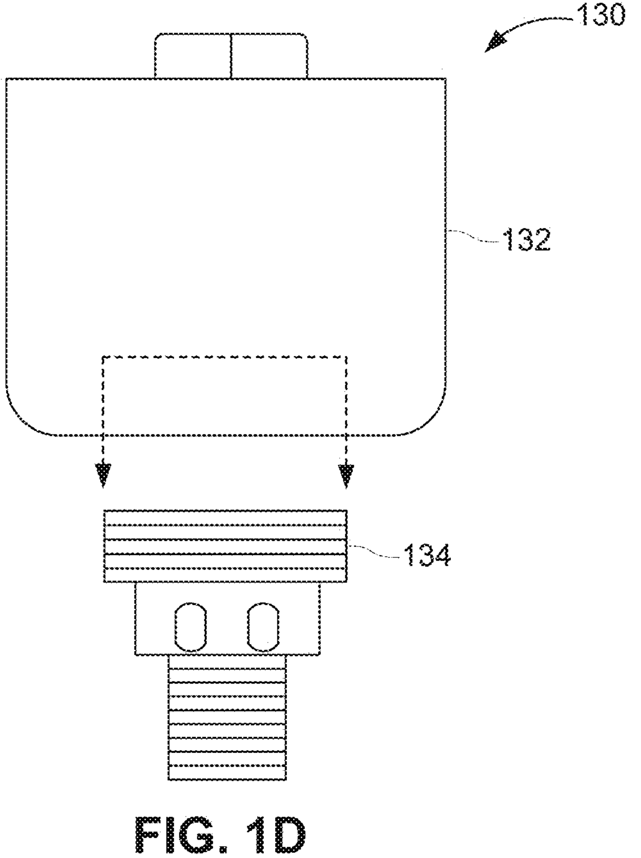
FIG. 1D illustrates an example hydraulic cylinder for a yaw brake system including a top portion and a bottom portion.

The arm 430 can include a socket 432 configured to couple with a portion, element, component, or the like, of a hydraulic cylinder. As shown in FIGS. 1C and 1D, a hydraulic cylinder can include a top portion including a protrusion. As can be appreciated, the socket 432 can include an aperture configured to align with a protrusion of a top portion of a hydraulic cylinder. Further, as shown in FIG. 1B, hydraulic cylinders of some brake systems, such as yaw brake systems for wind turbines, can be azimuthally arranged such that a hydraulic cylinder of the brake systems can have one or more adjacent hydraulic cylinders. In this way, the socket 432 can be configured to be coupled to a protrusion of an adjacent cylinder. In some embodiments, the socket 432 can be configured to be positioned along a length of the arm 430. For example, the arm 430 can include a rail, such that the socket 432 can be configured to be shifted along the rail based at least in part on a distance between the hydraulic cylinder and the adjacent hydraulic cylinder.

As understood by those skilled in the art, the torque device 420 may require reactionary stabilization depending on a reactionary force from the object for which the torque is applied. For example, if a torque is transferred to an inner surface of a plunger aperture of a hydraulic cylinder, the hydraulic cylinder may be misaligned, lodged, or the like such that the hydraulic cylinder can generate a reactionary force upon the transfer of torque from the tool 410 to the hydraulic cylinder. As can be appreciated, if the torque device 420 is operated by an operator/user, the reactionary force can be transferred to the operator/user, which may be dangerous or prevent proper operation of the system 400. In this way, the arm 430 can be configured to engage an adjacent hydraulic cylinder of the hydraulic cylinder. Stated otherwise, the arm 430 can be configured to provide a counteracting force based on a reactionary force experienced by the torque device 420. That is, the arm 430 can be referred to herein as a reaction arm, as the counteracting force provided by the arm 430 can be reactionary to resistance of the hydraulic cylinder to the torque provided by the torque device 420. As will be discussed in greater detail herein, the arm 430 can engage the adjacent hydraulic cylinder by abutting a portion of the arm 430 or the socket 432 to a side of the hydraulic cylinder. In other embodiments, the arm 430 can engage the adjacent hydraulic cylinder by coupling the socket 432 and the top portion of the adjacent hydraulic cylinder, as discussed herein.

Figure 5A:
FIGS. 5A-5B illustrate a top view of a bottom portion of a hydraulic cylinder, in accordance with examples of the present disclosure.
Figure 5A:
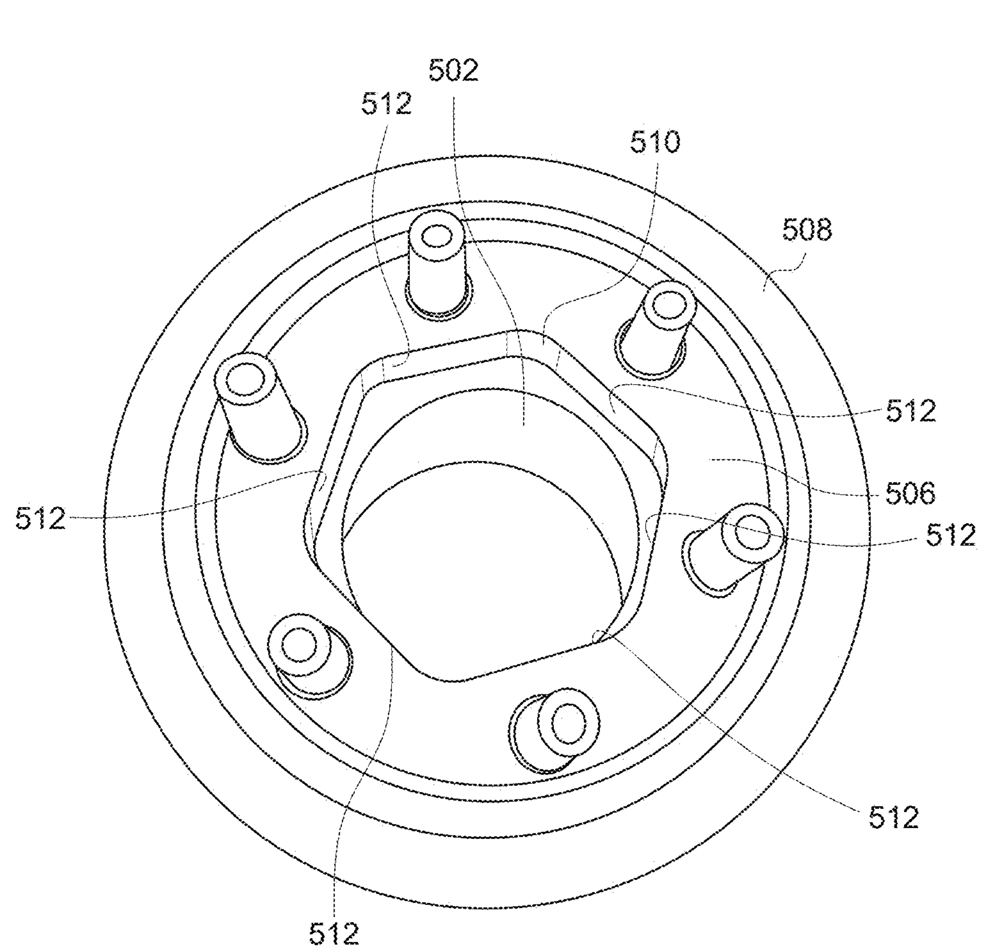

FIG. 5A illustrates a bottom portion 500 of a hydraulic cylinder including a plunger aperture 502. As can be appreciated, the bottom portion 500 can be the bottom portion 134 of the hydraulic cylinder 130, as discussed for FIG. 1D. As shown, the bottom portion 500 can include a bushing 506 and a housing 508. As understood by those skilled in the art, the bushing 506 can be rotationally fixed about a centerline of the bottom portion 500 via a plurality of rods attached to the housing 508 extending through a plurality of apertures of the bushing 506. That is, the bushing 506 can be removable from the housing 508 of the bottom portion 500. Accordingly, the bushing 506 can include a bushing aperture that in combination with another aperture of the housing 508, forms the plunger aperture 502. In this way, the plunger aperture 502, and any embodiments of the plunger aperture discussed herein, can include the bushing aperture of the bushing 506.

The bottom portion 500 can include an inner surface 510. As can be appreciated, the inner surface 510 can be an inner surface of the plunger aperture 502, such that the inner surface 510 is disposed at least partially within the plunger aperture 502. Further, the inner surface 510 can be an inner surface of the bushing aperture of the bushing 506. Stated otherwise, the inner surface 510 can include a surface of an interior of the plunger aperture 502 that is a part of the bushing 506. As shown, the inner surface 510, in some embodiments, can be a portion of the plunger aperture 502, such that the inner surface 510 may extend only a portion of a depth of the plunger aperture 502. In this way, embodiments of tools (e.g., the tool 200 and the tool 300) discussed herein can be configured to align with the bushing aperture of the bushing 506 of the bottom portion 500 to engage the inner surface 510 of the bushing aperture when inserted into the plunger aperture 502.

The inner surface 510 can include a plurality of surfaces 512. As shown, the plurality of surfaces 512 of the inner surface 510 can be arranged in such a way such that the inner surface 510 can have a shape. For example, the plurality of surfaces 512 can form a substantially hexagonal shape, such that the inner surface 510 of the plunger aperture 502 can be substantially hexagonally shaped. As can be appreciated, the plurality of surfaces 512 can have a plurality of edges connecting each side of the plurality of surfaces 512 to form the shape of the inner surface 510. The plurality of edges can include corners, chamfered edges, rounded edges, or similar transitions between sides of a shape of similar contexts as understood by those skilled in the art. Additionally, the inner surface 510 may be substantially triangular, substantially square, substantially rectangular, substantially octagonal, or any similar shape, as understood by those skilled in the art, used for plunger apertures of hydraulic cylinders. In this way, the plurality of surfaces 512 can be the form of major sides of a shape (e.g., six major sides of a hexagon). As discussed herein, at least a portion of a tool according to examples of the disclosed technology can be shaped based at least in part on the shape of the inner surface 510 of the plunger aperture 502.

Figure 5B:
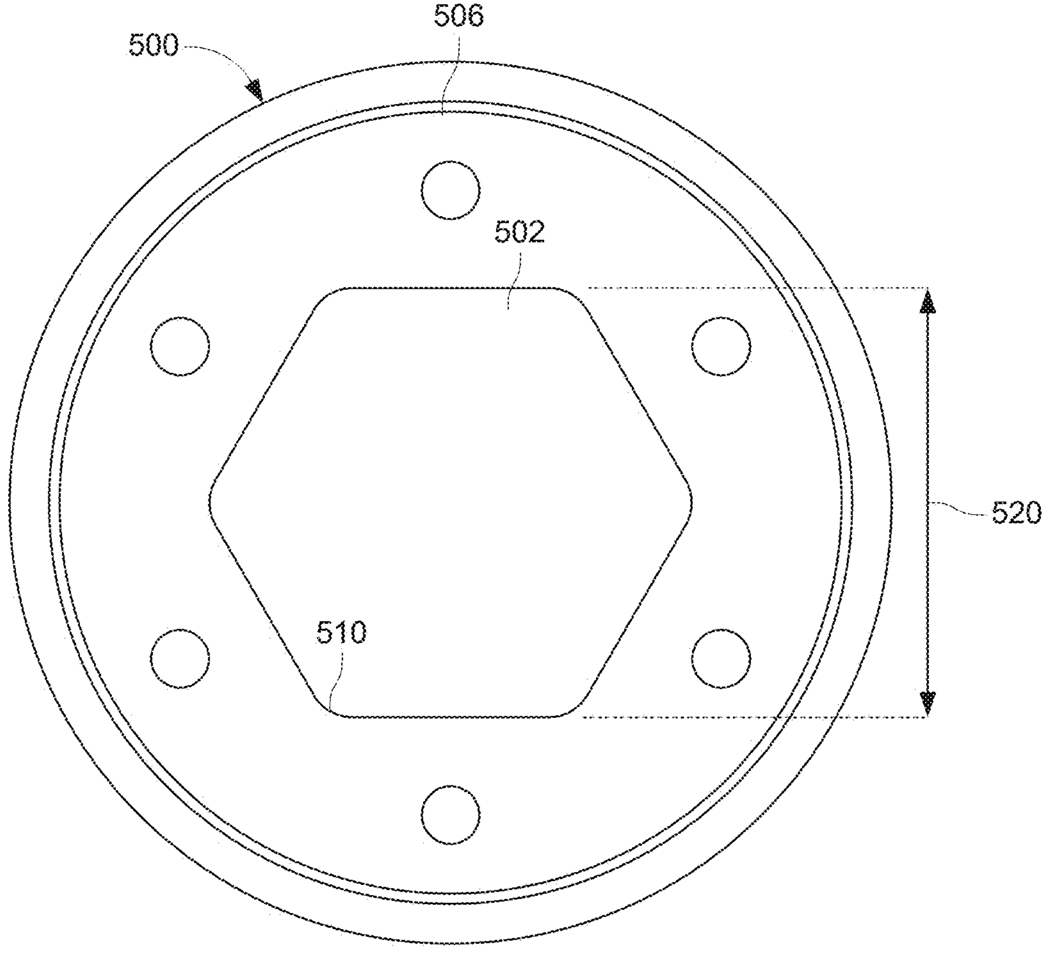

FIG. 5B illustrates the bottom portion 500 including the inner surface 510 and the plunger aperture 502. As shown, the inner surface 510 can extend an inner diameter 520. Stated otherwise, the inner diameter 520 can be a distance between opposites sides of the plurality of surfaces 512. That is, in some embodiments, the bushing aperture of the bushing 506 can extend the inner diameter 520. As discussed herein, a tool including a second portion (e.g., the second portion 210, the second portion 220, the second portion 304, and the second portion 414) can have an outer diameter (e.g., the outer diameter 214) that is substantially similar to the inner diameter 520, in such a way that the tool can be inserted, at least partially, into the plunger aperture 502. Further, the inner diameter 520 of the inner surface 510 can be substantially similar to the outer diameter of the tool such that when the tool is inserted into the plunger aperture 502, the outer diameter engages a plurality of the plurality of surfaces 512. In this way, the outer diameter of the tool can be configured to engage the inner surface 510 of the plunger aperture 502 by contacting a plurality of the plurality of surfaces 512 when inserted, at least partially, into the plunger aperture 502. The plurality of the plurality of surfaces 512 can include any number of the plurality of surfaces 512 such that the tool can transfer a torque to the interior portion 504. In some embodiments, the tool can be configured to contact each of the plurality of surfaces 512 when inserted, at least partially, into the plunger aperture 502. For example, the second portion (e.g., the second portion 204, the second portion 210, the second portion 220, the second portion 304, and the second portion 414) of the tool (e.g., the tool 200, the tool 300, and the tool 410) can be substantially hexagonally shaped, and the inner surface 510 of the plunger aperture 502 can be substantially hexagonally shaped, such that each of six major sides of the second portion of the tool can be configured to contact each of the plurality of surfaces 512 of the inner surface 510 when inserted, at least partially, into the plunger aperture 502. That is, an outer diameter of the second portion of the tool can be configured to extend the inner diameter 520 of the inner surface 510 such that the tool can simultaneously contact a plurality of the plurality of surfaces 512, in some embodiments the plurality of the plurality of surfaces 512 being each of the plurality of surfaces 512. In this way, the tool, or a portion thereof (e.g., embodiments of the second portion discussed herein), can be inserted into the plunger aperture 502 of the bottom portion 500 of the hydraulic cylinder and can be configured to rotate at least a portion (e.g., the interior portion 504) via an engagement of an outer diameter of at least a portion of the tool with the plurality of surfaces 512 of the inner surface 510 of the plunger aperture 502.

Figure 6:
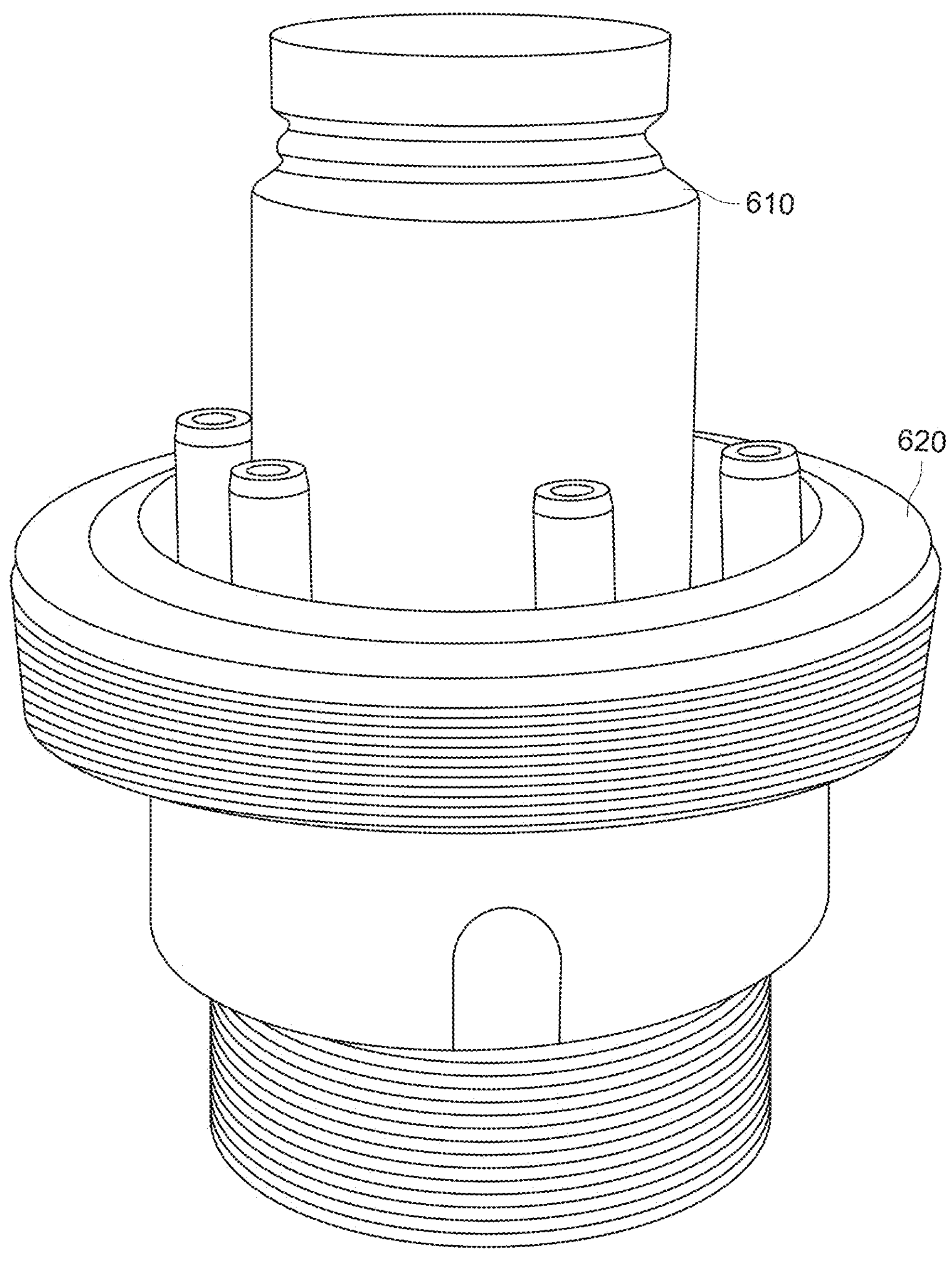
FIG. 6 illustrates a tool at least partially inserted into a hydraulic cylinder, in accordance with examples of the present disclosure.

FIG. 6 illustrates a tool 610 at least partially inserted into a bottom portion 620 of a hydraulic cylinder. The tool 610 can include any embodiments of the tool 200, the tool 300, and the tool 410 discussed herein, and the bottom portion 620 can include any embodiments of the bottom portion 134 and the bottom portion 500 discussed herein. As shown, at least a portion of the tool 610 can be configured to be inserted into the plunger aperture of the bottom portion 620. As can be appreciated, when inserted, at least the second portion of the tool 610 can be in contact with a plurality of surfaces of the inner surface of the plunger aperture such that the tool 610 can be configured to rotate at least a part of the bottom portion 620. As will be discussed in greater detail herein, the tool 610 can be inserted by hand into the bottom portion 620 of the hydraulic cylinder. That is, in some embodiments, the tool 610 can be inserted into the bottom portion 620 before being coupled to a torque device (e.g., the torque device 420). Inserting the tool 610, at least partially, by hand can allow for quick, manual alignment of the tool 610 with the plunger aperture of the bottom portion 620, enabling faster execution of hydraulic cylinder removal as compared to traditional methods. Inserting the tool 610 into the bottom portion 620 can be referred to herein as installing the tool 610, in that the tool 610 can be configured to rest in the bottom portion 620 after installation. As can be appreciated, a first portion (e.g., the first portion 202 or the first portion 412) may be of greater diameter than a second portion (e.g., the second portion 204, the second portion 210, the second portion 220, the second portion 304, or the second portion 414) of the tool 610, such that when the second portion of the tool 610 is inserted into the bottom portion 620, the a portion of the first portion can be configured to rest on a top surface of the bottom portion 620, preventing the tool 610 from sliding into the plunger aperture of the bottom portion 620 while not being held. Further, if a user is performing removal of at least the bottom portion 620 of the hydraulic cylinder, installing the tool 610 as shown can allow the user to transition from installing the tool 610 to operating a torque device for the tool 610 while using both hands, improving safety and efficiency of such a procedure.

Figure 7:
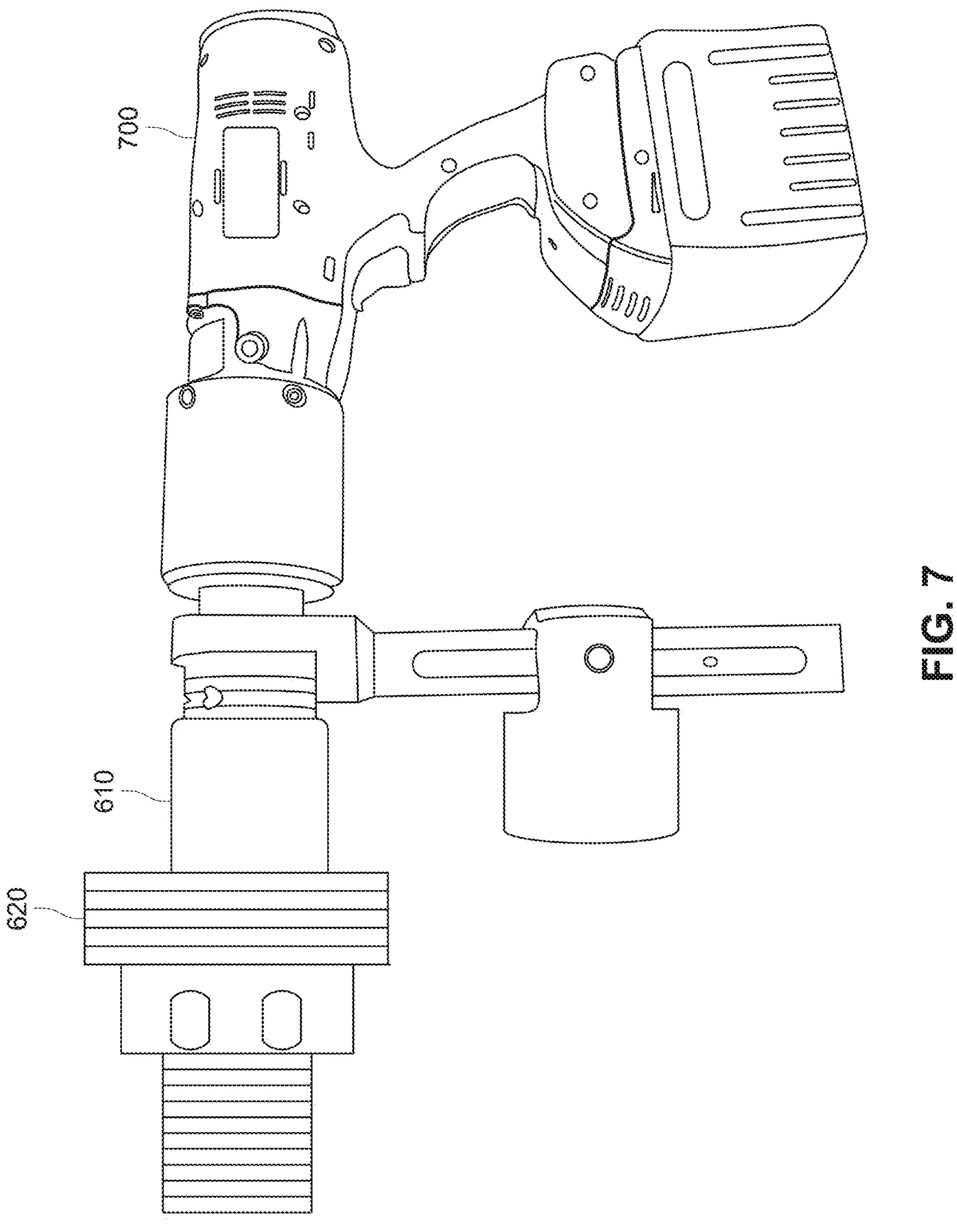
FIG. 7 illustrates a system for facilitating removal of hydraulic cylinders from brake systems, in accordance with examples of the present disclosure.

FIG. 7 illustrates the tool 610 inserted, at least partially, into the bottom portion 620 and coupled to a torque device 700. As can be appreciated, the torque device 700 can include any embodiments of the torque device 420 discussed herein. Similar to discussions of FIG. 6, the tool 610 can be at least partially inserted into the bottom portion 620 such that a torque generated by the torque device 700 can be transferred by the tool 610 to the bottom portion 620. As understood by those skilled in the art, the transfer of the torque may cause at least a portion of the bottom portion 620 to rotate. For example, the bottom portion 620 can include an interior portion (e.g., the interior portion 504) such that the tool 610 can be configured to rotate the interior portion of the bottom portion 620 to facilitate removal of the hydraulic cylinder from the brake system.

As discussed herein, the tool 610 can be inserted into the bottom portion 620 and the torque device 700 can be coupled to the tool 610 after insertion. In other embodiments, the tool 610 can be coupled to the torque device 700 prior to insertion, and the tool 610 can be inserted into the bottom portion 620 by a user operating the torque device 700. As can be appreciated, coupling the tool 610 to the torque device 700 prior to insertion can allow for quicker transition between hydraulic cylinders if performing removal on multiple hydraulic cylinders. Stated otherwise, the tool 610, in some embodiments, need not be decoupled from the torque device 700 between being inserted into and facilitating removal of a first hydraulic cylinder and being inserted into and facilitating removal of a second hydraulic cylinder.

Figure 8:
FIG. 8 illustrates a system for facilitating removal of hydraulic cylinders from brake systems, in accordance with examples of the present disclosure.
Figure 8:
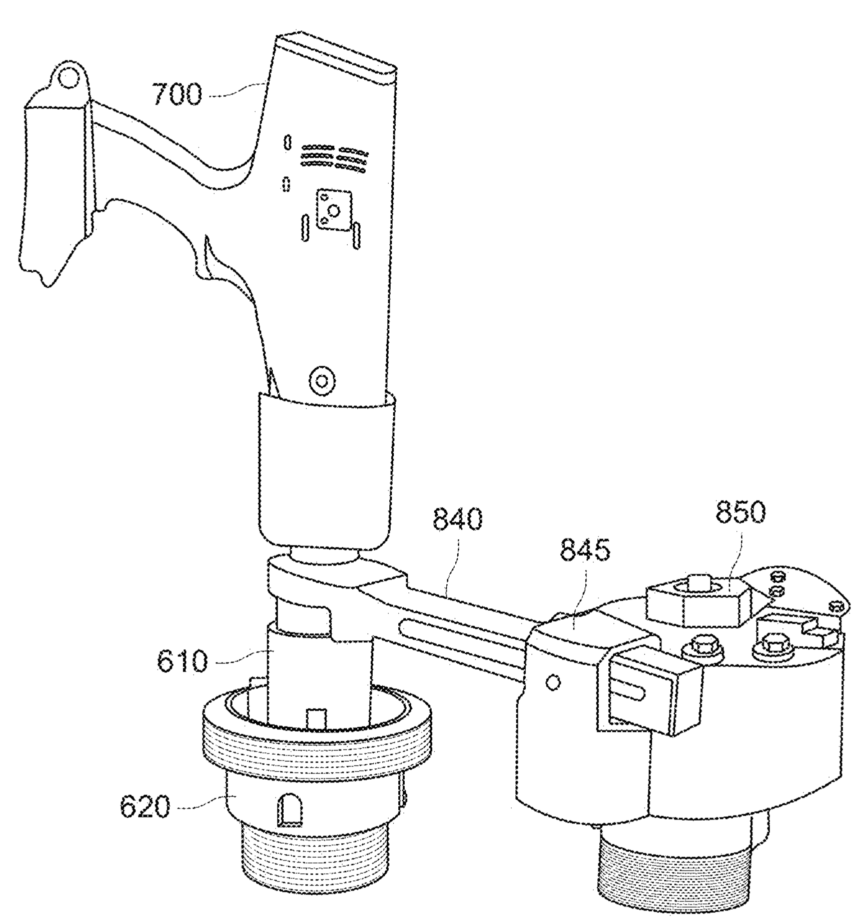

FIG. 8 illustrates the torque device 700 coupled to the tool 610 inserted, at least partially, into the bottom portion 620, the torque device 700 being further coupled to an arm 840. The arm 840 can include a socket 845 as shown. The arm 840 can include any embodiments of the arm 430 discussed herein and the socket 845 can include any embodiments of the socket 432 discussed herein. The arm 840 can be configured to engage an adjacent hydraulic cylinder 850 such that the arm 840 can provide a counteracting force to a reactionary force from the bottom portion 620. That is, the arm 840 can be configured to engage a side of the adjacent hydraulic cylinder 850, the side of the adjacent hydraulic cylinder being positioned so as to create an opposite moment to a rotational direction of the tool 610. Stated otherwise, the arm 840 can be manually positioned to abut the adjacent hydraulic cylinder 850 to stabilize the torque device 700 with the counteracting force discussed herein. For example, the socket 845 of the arm 840 can be positioned to abut the adjacent hydraulic cylinder 850, as shown. In this way, the torque device 700 can apply a torque to the tool 610 which, via an engagement of an outer diameter of a portion of the tool 610 with an inner surface of the plunger aperture of the bottom portion 620, can be transferred to the bottom portion, and any reactionary force from the bottom portion due to misalignment, lodging, or the like, can be offset by a counteracting force of the arm 840.

Figure 9:
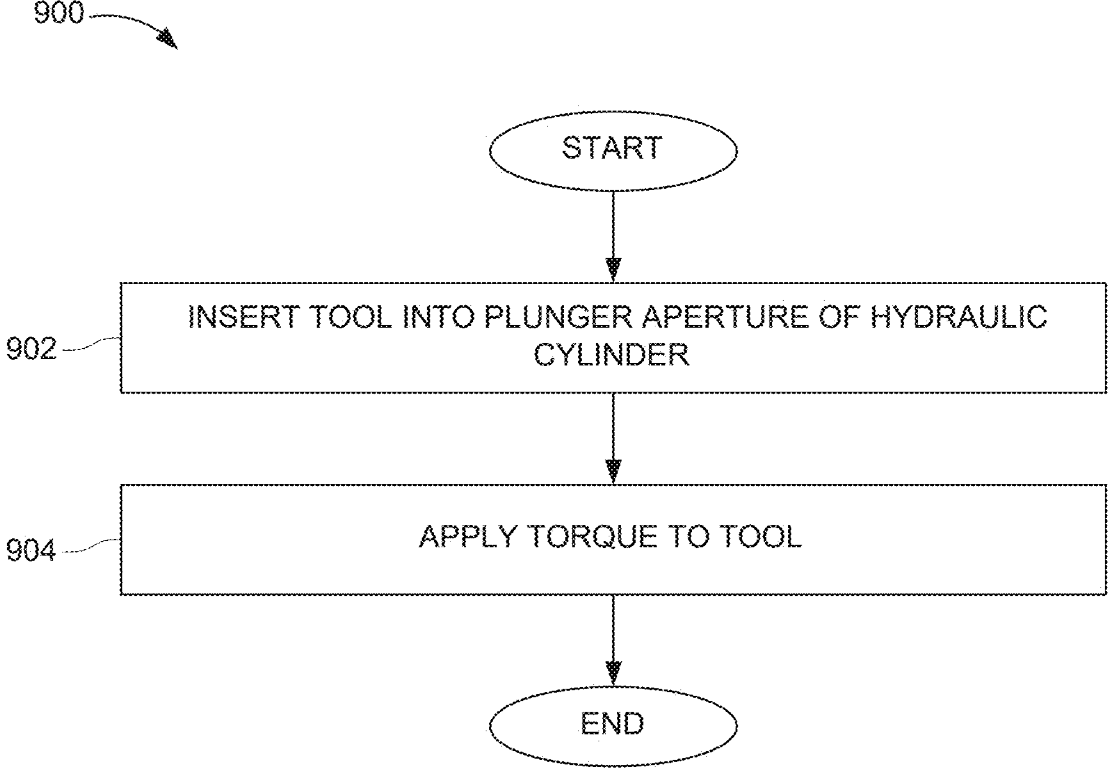
FIG. 9 is a flow diagram of a method for facilitating removal of hydraulic cylinders from brake systems, in accordance with examples of the present disclosure.

FIG. 9 illustrates a method 900 for facilitating removal of hydraulic cylinders from brake systems. The method 900 can include inserting 902 a tool into a plunger aperture of a hydraulic cylinder. As can be appreciated, the tool can include any embodiments of the tool 200, the tool 300, the tool 410, and the tool 610 discussed herein. The plunger aperture can include any embodiments of plunger aperture 502 discussed herein, and the hydraulic cylinder can include any embodiments of the hydraulic cylinder 122 and the hydraulic cylinder 130 discussed herein. For example, the hydraulic cylinder can be part of a brake system, such as a yaw brake system for a wind turbine. The wind turbine can include any embodiments of the wind turbine 100 discussed herein, and the yaw brake system can include any embodiments of the yaw brake system 112 discussed herein. The tool can be inserted partially into the plunger aperture, such that the tool can include a first portion and a second portion, the second portion being inserted into the plunger aperture. The first portion can include any embodiments of the first portion 202, the first portion 302, and the first portion 412 discussed herein, and the second portion can include any embodiments of the second portion 204, the second portion 210, the second portion 220, the second portion 304, and the second portion 414 discussed herein. The second portion can be configured to align with at least a portion of the plunger aperture, such that inserting 902 the tool into the plunger aperture can include engaging an outer perimeter of the second portion of the tool with an inner surface of the plunger aperture. The outer perimeter can include any embodiments of the outer perimeter 212, and the outer perimeter 222 discussed herein, and the inner surface can include any embodiments of the inner surface 510 discussed herein. That is, the inner surface can be an inner surface of the plunger aperture of a bottom portion of the hydraulic cylinder, and the bottom portion can include any embodiments of the bottom portion 134, the bottom portion 500, and the bottom portion 620 discussed herein.

Inserting 902 the tool into the plunger aperture can include engaging the outer perimeter of at least the second portion of the tool with a plurality of sides of the inner surface. The plurality of sides can include any embodiments of the plurality of surfaces 512 discussed herein. As discussed herein, the tool can be inserted into the plunger aperture such that the tool contacts a plurality of the plurality of surfaces of the inner surface. In some embodiments, inserting 902 the tool into the plunger aperture can include contacting major sides of the outer perimeter of the tool with the plurality of surfaces of the plunger aperture. As a non-limiting example, the outer perimeter can have six major sides and the plurality of surfaces can include six surfaces, such that inserting 902 the tool into the plunger aperture can include engaging the six major sides of the outer perimeter with the six surfaces of the inner surface. In this way, the tool can be inserted into the plunger aperture such that a mechanical advantage is created to enable the tool to rotate at least part of the bottom portion.

The method 900 can include applying 904 a torque to the tool. As understood herein, the tool can be configured to receive a torque from a torque device, such that applying 904 the torque to the tool can include generating a torque from the torque device coupled to the tool. The torque device can include any embodiments of the torque device 420 and the torque device 700 discussed herein. That is, as will be discussed in greater detail herein, the method 900 may include coupling the torque device to the tool. Applying 904 the torque to the tool can include actuating the torque device. As discussed herein, the torque device can be electrically actuated, mechanically actuated, hydraulically actuated, or any combination thereof, such that actuating the torque device may include receiving a user input. As can be appreciated, the tool can be inserted into the plunger aperture such that the application of the torque to the tool can cause the torque to be transferred to the bottom portion. For example, the tool can be inserted into the plunger aperture so as to contact the plurality of surfaces of the inner surface to create a mechanical advantage and enable a rotation of the tool to cause a rotation of at least a part of the bottom connection. In some embodiments, the bottom portion can include an interior portion (e.g., the interior portion 504) and an exterior portion (e.g., the exterior portion 508), with a bushing (e.g., the bushing 506) disposed between the interior portion and the exterior portion, such that a rotation of the tool can cause the interior portion to rotate with respect to the exterior portion. In this way, applying 904 the torque to the tool can include transferring the torque, via the tool, to the inner surface of the plunger aperture. As rotating the interior portion of the bottom portion can be a step in a process for removal of a hydraulic cylinder from a brake system, such as a yaw brake system, applying the torque to the tool inserted, at least partially, into the plunger can facilitate removal of the hydraulic cylinder from the brake system.

Figure 10:
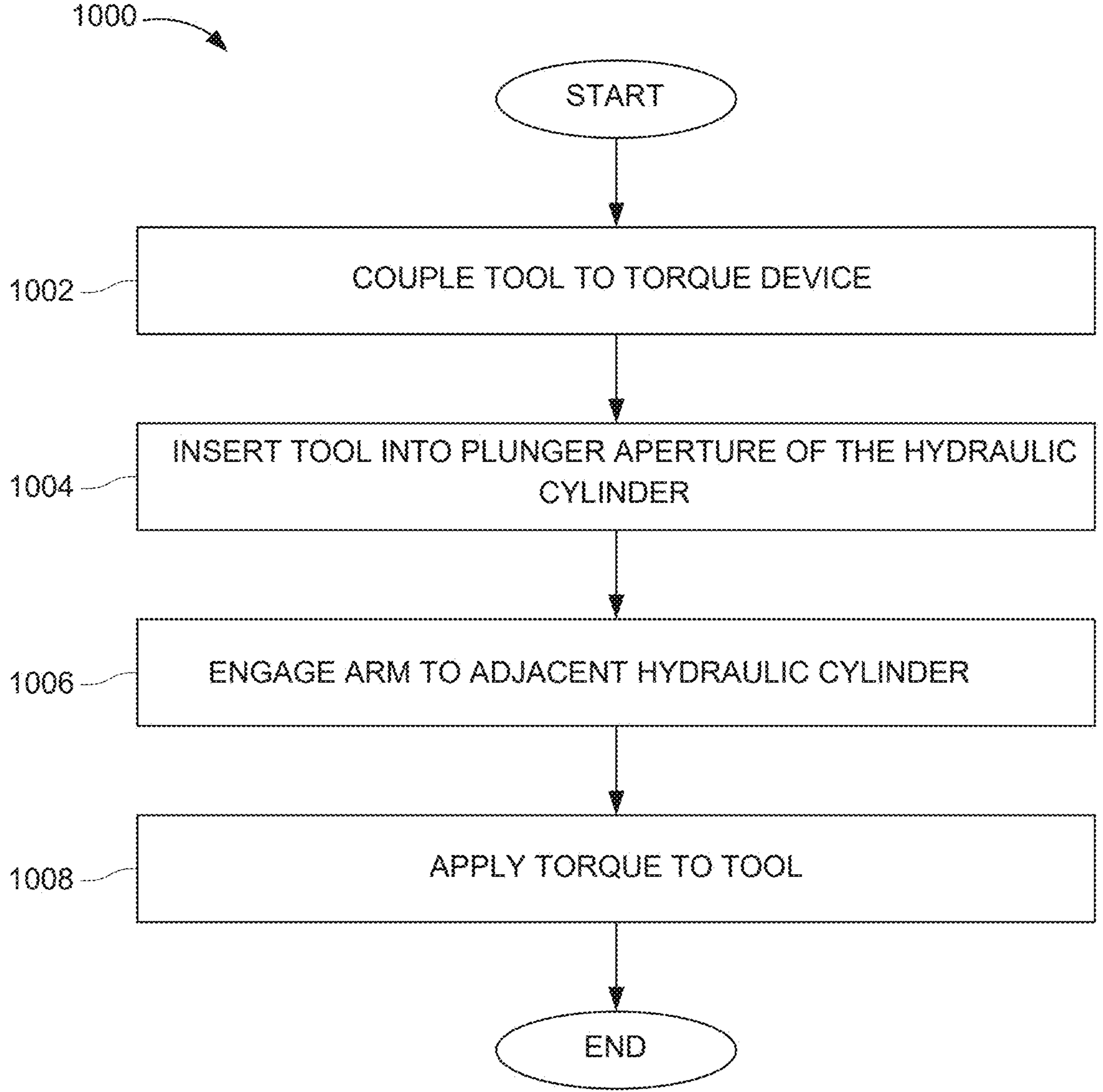
FIG. 10 is a flow diagram of a method for facilitating removal of hydraulic cylinders from brake systems, in accordance with examples of the present disclosure.

FIG. 10 illustrates a method 1000 for facilitating removal of hydraulic cylinders from brake systems. The method 1000 can include coupling 1002 a tool to a torque device. The tool can include any embodiments of the tool 200, the tool 300, the tool 410, and the tool 610 discussed herein. The torque device can include any embodiments of the torque device 420 and the torque device 700 discussed herein. That is, coupling 1002 the tool to the torque device can include coupling the tool to a drive component (e.g., the drive component 422) of the torque device. As discussed herein, coupling the tool to the drive component can include magnetic coupling, keying, and/or mechanical fastening. Coupling 1002 the tool to the torque device can include coupling a first portion of the tool to the torque device. The first portion can include any embodiments of the first portion 202, the first portion 302, and the first portion 412 discussed herein. That is, coupling the first portion to the torque device can include coupling the first portion of the tool to the drive component of the torque device. In some embodiments, the first portion can include one or more grooves, an aperture, a protrusion, or the like configured to allow the drive component to transfer rotational force to the tool when the first portion is coupled to the drive component. For example, the first portion can include a coupling portion (e.g., the coupling portion 306) configured to mechanically interact with the drive component of the torque device to allow a transfer of rotational motion from the drive component to the tool.

As before, the method 1000 can include inserting 1004 the tool into a plunger aperture of a hydraulic cylinder. The method 1000 can further include engaging 1006 an arm to an adjacent hydraulic cylinder. The adjacent hydraulic cylinder can include any embodiments of the adjacent hydraulic cylinder 850 discussed herein. The arm can include any embodiments of the arm 430 and the arm 840 discussed herein. As can be appreciated, the arm can include a socket including any embodiments of the socket 432 and the socket 845 discussed herein. That is, engaging 1006 the arm to the adjacent hydraulic cylinder can include coupling the socket to a portion of the hydraulic cylinder. In some embodiments, the socket can be coupled to a protrusion of the hydraulic cylinder via keying, magnetic coupling, mechanical fastening, or the like. In other embodiments, the arm can be engaged to the adjacent hydraulic cylinder by abutting the arm and a side of the hydraulic cylinder, as shown in FIG. 8. For example, the socket can be positioned to abut the hydraulic cylinder when the tool is inserted into the plunger aperture of the hydraulic cylinder. In this way, engaging 1006 the arm to the hydraulic cylinder can include stabilizing the torque device via a counteracting force from the arm to counter a reactionary force from the hydraulic cylinder, as discussed herein.

Similarly, engaging 1006 the arm to the adjacent hydraulic cylinder can include attaching the arm to the torque device. As discussed herein, the arm can be attached, or coupled, to the drive component of the torque device in such a way that the arm does not receive the torque applied to the tool. In this way, the arm can provide a reactionary moment to resistance from the torque.

As before, the method 1000 can include applying 1008 a torque to the tool. As discussed herein, applying 1008 the torque to the tool can include applying the torque to the bottom portion of the hydraulic cylinder by transferring the torque from the drive component of the torque device to the inner surface of the plunger aperture of the bottom portion via the tool. Stated otherwise, the torque can be applied to the tool by the torque device generating the torque and transferring the torque via the drive component of the torque device. As discussed herein, the torque can be generated by the torque device via means of converting electric, mechanical, or hydraulic power into rotational force/motion as understood in the art. For example, the torque device can include a power source (e.g., the power source 424), such that the torque can be generated by the torque device by converting power supplied by the power source into rotational force.

As can be appreciated, applying 1008 the torque to the tool can include stabilizing the torque device. The torque device can be stabilized via the arm, such that stabilizing the torque device can include providing a counteracting force based on reactionary forces from the hydraulic cylinder. As a non-limiting example, the torque device can generate the torque, the tool can transfer the torque to the interior portion (e.g., the interior portion 504) of the bottom portion via the inner surface of the plunger aperture, and the interior portion can be lodged, misaligned, etc. such that a reactionary force is experienced by the torque device through the tool. In the non-limiting example, the arm can provide a substantially equivalent counteracting force in such a way that the torque device, or an operator/user of the torque device, does not receive the reactionary force from the hydraulic cylinder.

The method just described is offered for explanatory purposes and should not be construed as limited to the particular steps and order of steps just described. That is, the method just described can include other intervening steps not described or the method can be completed in an order other than described herein. Accordingly, the method should be understood in the context of the entire disclosure presented herein.

EXAMPLE USE CASE

The disclosed technology can be understood according to the following use cases. This section is included solely for explanatory purposes and not limitation.

Removal of a hydraulic cylinder for maintenance and/or replacement can begin by removal of a top portion, or top hat, of the hydraulic cylinder. As discussed herein, the top portion may be removed by unscrewing the top portion by hand. Removal of the top portion can expose a plunger and busing of a bottom portion of the hydraulic cylinder. After removing the top portion, a snap ring of the bottom portion can be removed, followed by the plunger and bushing. As can be appreciated, removing the plunger can expose a plunger aperture of the bottom portion. In some cases, the plunger and bushing may be attached, such that the bushing can be separated from the plunger and reinstalled into the bottom portion. As discussed herein, the bushing rotationally fixed within the bottom portion via a series of protrusions, prongs, bolts, or the like. The bushing may include the inner surface discussed herein, such that the bushing being reinstalled allows the tool to be configured to align with the inner surface. That is, after reinstalling the bushing, the tool can be partially inserted into the plunger aperture, aligning with the bushing. As discussed herein, the tool can include a second portion configured to align with and engage the inner surface of the bushing and a first portion that can be coupled to a torque device. In some cases, the first portion can have a greater diameter than the second portion, as discussed herein, such that the tool can be installed into the plunger aperture by inserting the second portion of the tool into the plunger aperture and engaging a surface of the first portion of the tool with a top surface of the bushing. After installing the tool, the torque device can be coupled to the tool. In some cases, a socket of a drive component of the torque device can align with a protrusion of the tool to allow transfer of torque from the torque device to the tool. Once the torque device is engaged with the tool, an arm of the torque device can be positioned to abut an adjacent hydraulic cylinder. After positioning the arm, the torque device can loosen the bottom portion of the hydraulic cylinder by transferring torque to the bushing of the bottom portion via the tool, while being stabilized by the interaction of the arm and the adjacent hydraulic cylinder. After the bottom portion of the cylinder has been loosened, the bottom portion can be removed, in some cases by hand, thus completing removal of the hydraulic cylinder.

The disclosed technology can be further understood according to the following clauses:

Clause 1: A method for facilitating removal of a hydraulic cylinder from a brake system, comprising: inserting a tool, at least partially, into a plunger aperture of the hydraulic cylinder, the tool comprising an outer perimeter configured to engage an inner surface of the plunger aperture; and applying a torque to the tool to rotate the hydraulic cylinder.

Clause 2: The method of Clause 1, wherein the brake system is a yaw brake system of a wind turbine.

Clause 3: The method of Clause 1, further comprising coupling the tool to a torque device configured to apply torque to the tool.

Clause 4: The method of Clause 3, wherein applying the torque to the tool to rotate the hydraulic cylinder comprises transferring the torque from the tool to the hydraulic cylinder via the inner surface of the plunger aperture.

Clause 5: The method of Clause 3, further comprising engaging an arm coupled to the torque device to an adjacent hydraulic cylinder of the brake system.

Clause 6: The method of Clause 1, wherein the tool is characterized by an outer diameter that substantially extends an inner diameter of the inner surface of the plunger aperture.

Clause 7: The method of Clause 6, wherein inserting the tool, at least partially, into the plunger aperture of the hydraulic cylinder comprises engaging the outer perimeter of the tool with a plurality of surfaces of the inner surface.

Clause 8: The method of Clause 1, wherein inserting the tool, at least partially, into the plunger aperture of the hydraulic cylinder further comprises inserting the tool, at least partially, into a bottom portion of the hydraulic cylinder.

Clause 9: A system for facilitating removal of a hydraulic cylinder from a brake system, comprising: a tool comprising an outer perimeter, the tool being configured to be inserted, at least partially, into a plunger aperture of the hydraulic cylinder and to engage an inner surface of the plunger aperture of the hydraulic cylinder; and a torque device coupled to the tool and configured to apply a torque to the tool, wherein the tool is further configured to transfer the torque to the hydraulic cylinder to rotate the hydraulic cylinder for removal from the brake system.

Clause 10: The system of Clause 9, wherein the brake system is a yaw brake system of a wind turbine.

Clause 11: The system of Clause 9, further comprising an arm coupled to the torque device and configured to provide a counteracting force based on a reactionary force experienced by the torque device.

Clause 12: The system of Clause 9, wherein the hydraulic cylinder comprises: a top portion; and a bottom portion comprising the plunger aperture, the inner surface of the plunger aperture comprising a plurality of surfaces disposed about a perimeter of the inner surface.

Clause 13: The system of Clause 12, wherein the outer perimeter of the tool is characterized by having an outer diameter substantially extending an inner diameter of the inner surface of the plunger aperture.

Clause 14: The system of Clause 13, wherein the outer perimeter of the tool is configured to engage a plurality of the plurality of surfaces.

Clause 15: The system of Clause 13, wherein the inner surface is substantially hexagonally shaped, the plurality of surfaces of the inner surface comprising six surfaces, such that the tool is configured to rotate a bottom portion of the hydraulic cylinder by engaging at least four surfaces of the six surfaces.

Clause 16: The system of Clause 9, wherein the tool further comprises: a first portion configured to couple to the torque device; and a second portion comprising the outer perimeter.

Clause 17: A tool for facilitating removal of a hydraulic cylinder from a brake system, comprising: a first portion configured to couple to a torque device; and a second portion configured to align with a plunger aperture of the hydraulic cylinder and to be inserted, at least partially, into the plunger aperture, the second portion comprising an outer perimeter configured to engage an inner surface of the plunger aperture.

Clause 18: The tool of Clause 17, wherein the outer perimeter of the second portion is configured to contact each surface of a plurality of surfaces of the inner surface.

Clause 19: The tool of Clause 17, wherein the tool is configured to transfer a torque from a torque device to the hydraulic cylinder via engagement of the outer perimeter of the second portion with the inner surface.

Clause 20: The tool of Clause 17, wherein the hydraulic cylinder comprises a bottom portion comprising the plunger aperture, the tool being configured to rotate the bottom portion of the hydraulic cylinder.

While the present disclosure has been described in connection with a plurality of exemplary aspects, as illustrated in the various figures and discussed above, it is understood that other similar aspects can be used, or modifications and additions can be made to the described subject matter for performing the same function of the present disclosure without deviating therefrom. In this disclosure, methods and compositions were described according to aspects of the presently disclosed subject matter. But other equivalent methods or compositions to these described aspects are also contemplated by the teachings herein. Therefore, the present disclosure should not be limited to any single aspect, but rather construed in breadth and scope in accordance with the appended claims.

What is claimed is:

1. A method for facilitating removal of a hydraulic cylinder from a yaw brake system of a wind turbine, comprising: inserting a tool, at least partially, into a plunger aperture of the hydraulic cylinder, the tool comprising an outer perimeter configured to engage an inner surface of the plunger aperture; and applying a torque to the tool to rotate the hydraulic cylinder.

2. The method of claim 1, wherein the inserting the tool, at least partially, into the plunger aperture of the hydraulic cylinder further comprises inserting the tool, at least partially, into a bottom portion of the hydraulic cylinder.

3. The method of claim 1, wherein the tool is characterized by an outer diameter that substantially spans an inner diameter of the inner surface of the plunger aperture.

4. The method of claim 3, wherein the inserting the tool, at least partially, into the plunger aperture of the hydraulic cylinder comprises engaging the outer perimeter of the tool with a plurality of surfaces of the inner surface.

5. The method of claim 1, further comprising coupling the tool to a torque device configured to apply torque to the tool.

6. The method of claim 5, wherein applying the torque to the tool to rotate the hydraulic cylinder comprises transferring the torque from the tool to the hydraulic cylinder via the inner surface of the plunger aperture.

7. The method of claim 5, further comprising engaging an arm coupled to the torque device to an adjacent hydraulic cylinder of the brake system.

8. A system for facilitating removal of a hydraulic cylinder from a yaw brake system of a wind turbine, comprising:

a tool comprising an outer perimeter, the tool being configured to be inserted, at least partially, into a plunger aperture of the hydraulic cylinder and to engage an inner surface of the plunger aperture of the hydraulic cylinder; and a torque device coupled to the tool and configured to apply a torque to the tool, wherein the tool is further configured to transfer the torque to the hydraulic cylinder to rotate the hydraulic cylinder for removal from the brake system.

9. The system of claim 8, further comprising an arm coupled to the torque device and configured to provide a counteracting force based on a reactionary force experienced by the torque device.

10. The system of claim 8, wherein the tool further comprises:

a first portion configured to couple to the torque device; and a second portion comprising the outer perimeter.

11. The system of claim 8, wherein the hydraulic cylinder comprises:

a top portion; and a bottom portion comprising the plunger aperture, the inner surface of the plunger aperture comprising a plurality of surfaces disposed about a perimeter of the inner surface.

12. The system of claim 11, wherein the outer perimeter of the tool is characterized by having an outer diameter substantially extending spanning an inner diameter of the inner surface of the plunger aperture.

13. The system of claim 12, wherein the outer perimeter of the tool is configured to engage a plurality of the plurality of surfaces.

14. The system of claim 12, wherein the inner surface is substantially hexagonally shaped, the plurality of surfaces of the inner surface comprising six surfaces, such that the tool is configured to rotate a bottom portion of the hydraulic cylinder by engaging at least four surfaces of the six surfaces.

* * * * *